United States Patent
Koehl

[15] 3,662,428
[45] May 16, 1972

[54] FASTENING PINS
[72] Inventor: Hans H. Koehl, Brooklyn, Conn.
[73] Assignee: C. E. M. Company, Inc., Danielson, Conn.
[22] Filed: Aug. 13, 1969
[21] Appl. No.: 849,768

[52] U.S. Cl..................................16/43, 16/39, 248/188.8
[51] Int. Cl................B60b 33/00, A47b 91/00, F16m 11/20
[58] Field of Search..................16/38, 39, 43, 121; 248/188.8

[56] References Cited

UNITED STATES PATENTS

| 1,141,342 | 6/1915 | Jones | 16/39 |
| 1,329,585 | 2/1920 | Diss | 16/39 |
| 1,489,206 | 4/1924 | Greene | 16/43 |
| 706,336 | 8/1902 | Nickel | 16/39 |
| 759,408 | 5/1904 | Tonini | 16/39 |
| 816,211 | 3/1906 | Bischoff | 16/38 |
| 3,336,059 | 8/1967 | Leitmann | 16/121 X |

*Primary Examiner*—Paul R. Gilliam
*Attorney*—Ernest G. Montague

[57] ABSTRACT

A fastening pin, comprising a coil wound sheet material providing an external resilience and having an inner end portion on the inner surface thereof terminating in an edge extending along its length, the end portion including the edge at least in part spaced from the sheet material wound thereunder constituting an interior inwardly, radially directed bump formation providing an independent interior resilience. The spirally wound sheet material has a diametric thickness through the bump formation smaller than the diametric thickness through the rest of the coil wound sheet material.

11 Claims, 5 Drawing Figures

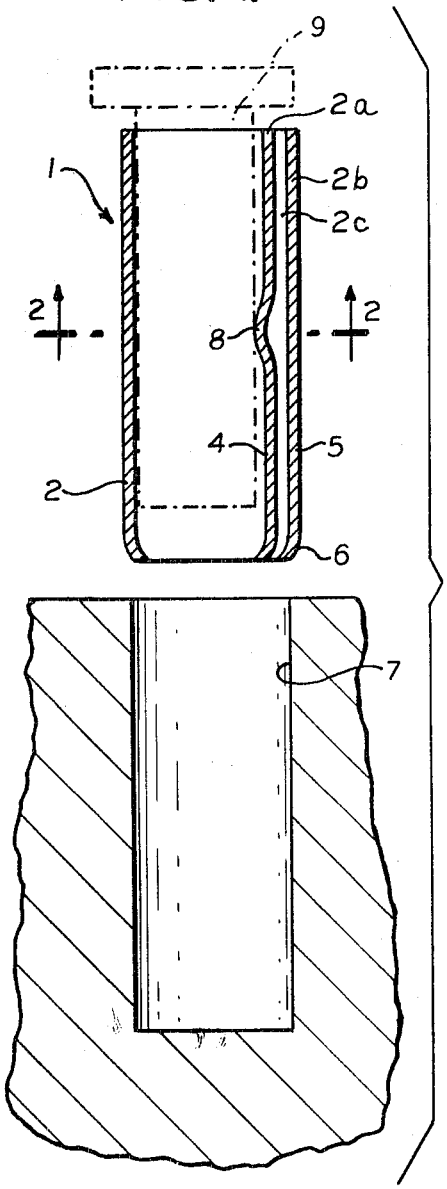
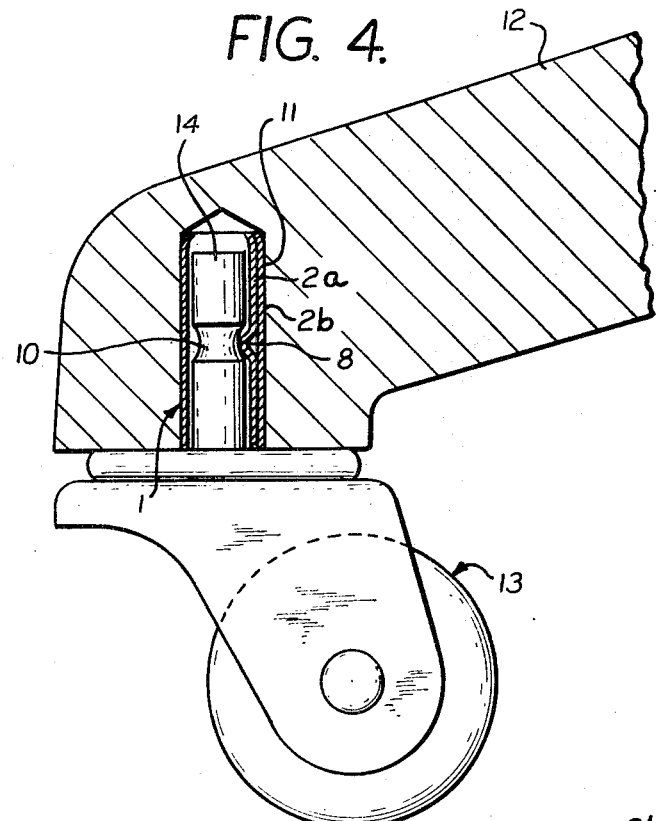
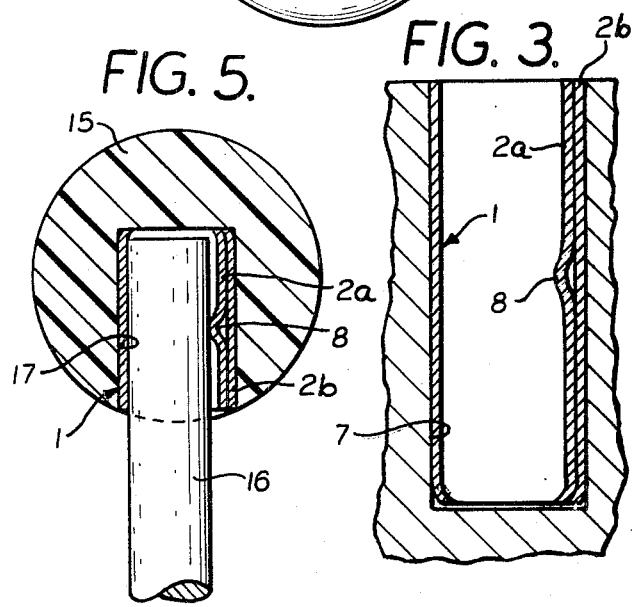
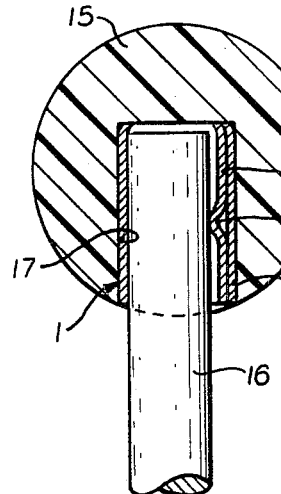
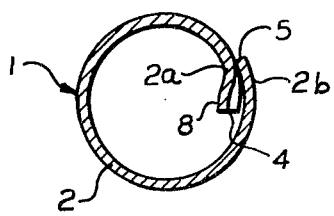
INVENTOR
HANS H. KOEHL
BY
ATTORNEY.

FASTENING PINS

The present invention relates to fastening pins, in general, and to coiled resilient spring pins, in particular.

Spirally coiled resilient spring pins are known and comprise one or more turns of convolutely wound sheet material. These pins have a free diameter larger than the recommended hole for which they are designed, and have at least one end tapered to facilitate insertion of the pin into the hole. When the pin is inserted, due to the elastic action of the pin, the diameter of the pin is reduced to the diameter of the hole, producing a radial compression on the pin which retains the pin in the hole, but which drastically reduces the resiliency of the pin. The reduction in diameter resulting from the insertion of the pin increases radial friction between the windings to the point where further relative movement becomes practically impossible, whereby the flexibility of the pin is reduced. With these pins no controlled effective flexibility remains after insertion.

Furthermore, spring pins are generally designed for loading in a plane 90° to the axis of the pin. Spring pins have been used to connect parts to parts with holes therein in an axial manner. In certain assemblies, however, it is not feasible to provide holes in each of the parts to be connected. In such assemblies one part is usually provided with a hole and the second part to be connected has a projection such as a stud. In order to connect parts of this nature, it is necessary to have a spring pin with both independent external resilience (for retention in the hole) and internal resilience (for retention on the projection). In the design of such a pin, it has to be noted that the resilience has to be of an independent nature since both the external and internal diameters of the spring pin change as it is driven into a hole.

It is an object of the present invention to provide a spiral spring n having independent inn-external retention capabilities.

It is another object of the present invention to provide a spiral spring pin having independent internal-external retention capabilities comprising a spirally wound resilient sheet material formed by rolling resilient material of uniform thickness one or more revolutions, and formed with one or more bump like projections on its inner end. The spring pin has at least slightly more than one revolution so as to eliminate the possibility of any longitudinal slot and the resulting nesting of parts within each other. Furthermore, having more than one revolution substantially improves the radial spring action of the pin and permits the use of a thinner material. Since the design of the pin permits the use of a thinner, more resilient material, the inner bump-like projections provide the internal resilience for the pin.

Such a pin retains it independent internal resiliency provided by the inner bump-like projections after its independent external resilience is utilized for retaining the pin in a hole. The independent internal resilience may be utilized to hold a stud projection inserted into the interior of the pin. Furthermore, the bumps can be used to mate with corresponding grooves in the stud projection which is inserted into the pin. The difference in diameter between the hole into which the pin is driven and the stud projection which is driven into the side of the pin can be varied by increasing the number of revolutions in the pin. A chamfer is provided on one end of the pin to facilitate the insertion of the pin into the hole. The other end may be provided with a lead-in to facilitate insertion of the stud.

Such a pin in accordance with the present invention has all the advantages of the presently known spirally coiled pins and can be manufactured in the same manner as the above described pin. It is also to be noted that the external shock absorbing qualities of the spring pin of the present invention are not destroyed by the independent internal locking feature of the pin.

One application for the internal-external resilient pin of the present invention is in use of caster sockets of the like. There are presently two main methods of retaining a caster within the socket. The first utilizes a resilient ring which is fitted into a groove on the caster stud. The second method provides for a resilient ring in the caster socket itself. Both of these utilize a multi-part design, and particularly, the latter is a rather complicated assembly. The pin in accordance with the present invention can be advantageously used as a caster socket. It would permit the use of a plain stud of a stud with a single groove. In both instances, both the stud and the socket are reduced from multi-part assemblies to a single part design. This particular application also demonstrates another important feature of the pin of the present invention. Since the contact internally can be regulated in accordance with the present invention, by the number of internal bumps, the amount of frictional contact internally can be fairly closely regulated. The frictional contact on the outside of the pin covers a minimum of 300' of the external surface. As a result of the fixed external contact area and the variable internal contact area, the part can be designed to consistently assure removal of the stud without removing the sleeve or pin from its hole.

Furthermore by the present invention the internal resilience can be limited and positioned at any desired position along the length of the pin, by providing the bumps at a predetermined positions.

The present invention is a further development of my copending U.S. Pat. application, Ser. No. 780,965, entitled "-Coiled Fastening Pin", which was filed on Dec. 4, 1968.

With these and other objects in view which will become apparent in the following detailed description, the present invention will be clearly understood in connection with the accompanying drawing, in which:

FIG. 1 is an exploded axial section of an internal-external resilient spring pin according to the present invention, showing a stud to be inserted therein in dashed lines, and a bore in which the pin is to be inserted;

FIG. 2 is a section of the spring pin taken along the lines 2—2 of FIG. 1;

FIG. 3 is an axial section of the spring pin and bore of FIG. 1 in the inserted position prior to insertion of the stud;

FIG. 4 is an axial section of one embodiment of an internal-external resilient spring pin assembly, for example, a caster socket, the caster being illustrated in side elevation; and FIG. 5 is an axial section of another embodiment of the spring pin assembly of the present invention illustrating the holding of a plastic knob to a shaft.

Referring now to the drawing, and more particularly to FIGS. 1, 2 and 3, an internal-external resilient spring pin useful as an axial retention bushing in accordance with the present invention, is illustrated. The pin 1 is produced from a spirally wound sheet of material 2 of substantially uniform thickness. The sheet of material 2 may be made of, for example, a metal such as high carbon steel, spring brass, and other resilient copper alloys, or other material having a substantial degree of spring action as well as sufficient rigidity to substantially retain its shape.

The coiled pin 1 is formed preferably of slightly more than at least one complete winding, although the number of windings of the sheet 2 as well as its axial length is selected depending upon the selected sheet material, the thickness and other characteristics thereof, as well as the size of the hole in which it is to be inserted, and the size of a stud which is to be axially inserted therein. The number of coils and the thickness of the roll and the particular design depend on the flexibility or strength desired.

As illustrated in FIG. 2, although not limited thereto, the overlapping portions of the adjacent facing surfaces of the coiled sheet, herein illustrated as overlapping inner and outer end portions 2a and 2b, respectively, are slightly spaced from each other forming a space 2c therebetween. The extreme longitudinal edges 4 and 5, constituting the inner and outer edges of the inner part 2a and the outer portion 2b, respectively, of the sheet 2 extend substantially parallel to the axis of the pin. At least one open end 6 of the pin 1 is tapered, as shown in FIG. 1, constituting a chamber. The chamfered end 6 of the pin 1 is designed for ready insertion of the pin 1 into a bore 7 of slightly smaller diameter than the outer diameter of the pin.

When the pin 1 is inserted into the bore 7, for example as illustrated in FIGS. 3 – 5, since the bore is smaller than the outer diameter of the pin prior to insertion as shown in FIG. 1, the pin 1 contracts in the bore due to its resiliency and the space 2c between the overlapping layers substantially disappears, since the overlapping layers are pressed contactingly and abuttingly against each other. This resiliency of the coil is the external resiliency of the spring pin which is utilized for the insertion retention of the spring pin in the bore, securing the pin therein. The pin, then in the bore inserted position, serves as a hollow bushing with its own independent inner resiliency as will hereinafter be described.

The inner end portion 2a of the pin 1 in accordance with the present invention is formed with at least one inwardly directed radial bump or dent 8 adjacent the extreme inner edge 4 of the pin 1.

The inner diameter of the pin 1 is smallest through the bump or dent 8 of the pin 1; the inner diameter through all other portions of the pin, other than the bump, is larger.

The bump 8 is resilient, and constitutes the internal resiliency of the spring pin of the present invention. The pin of the present invention is uniquely suitable for the releasable or non-releasable axial securing of a smooth or grooved stud member therein due to its independent internal resiliency which can be as varied in intensity as desired, by increasing the number of bumps. The bump 8 elastically contracts to a degree when a stud 9 is inserted having an outer diameter greater than the inner diameter of the spring pin 1 through bump 8, but smaller than the inner diameter of the pin 1 (when inserted in the bore 7) at other portions of the pin. As a consequence, the bump 8 resiliently holds the stud under spring-like frictional pressure in the interior of the pin 1, providing the required flexibility for retention of the stud 9 in the pin 1, the pin serving as an axial, spring friction retention bushing for the stud. The bump 8 under compressive forces, presses resiliently against the stud thereby pressing it against the opposite inner wall of the pin 1, opposite from the edge 4 on which the bump is located. Adjacent the bump 8, the stud 9 is spaced slightly from the walls of the inner end portion 2a of the pin 1. The bump 8 preferably is formed at the center of the length of the pin 1 and extends to the extreme edge of the inner end portion 2a of the pin 1.

Accordingly with the present invention, internal resiliency for retaining a stud member inside the pin 1, after the pin is inserted in a bore securing itself therein, is provided by the bump 8. This internal resiliency is independent and unaffected by the external resiliency provided by the coiled effect of the spring pin. With the initial insertion of the pin 1 in the bore 7, and the consequent contraction of the coil and the resulting dissipation of the external or coiled resiliency (used to retain the pin in the bore), the internal flexibility, however, provided by the inwardly directed bump is not affected. Accordingly the bump is available for subsequent use in retaining a stud therein and providing an independent internal resiliency. A plurality of bumps may be provided at various selected points along the inner surface of the pin 1 in order to vary the degree of internal holding action for retaining a stud in the pin.

Since the bump or internal resiliency of the pin is not affected during insertion of the pin in a bore, the pin offers the desired internal flexibility and/or strength when in the inserted position for holding a stud or the like therein.

Conversely the flexing of the bump during the releasable holding of a stud therein, does not affect the retention or security of the pin in the bore, since the pin is independently maintained in the bore by the external stored resiliency of the compressed coils of the spring pin in the bore.

The stud may be removed, and inserted releasably in the pin, and the bump being small provides a concentrated spring force at its portion which is elastic and may be utilized repeatedly. Slight compression of the bump is provided upon insertion of a stud, and the elastic limit is not exceeded since the bump is strong and provides a good spring action. As disclosed in FIGS. 4 and 5, an inserted stud does not fully flatten out the bump.

Referring now to the drawings and more particularly to FIG. 4, the internal bump on the pin may be utilized to hold a stud having a groove therein. FIG. 4 illustrates a bore 11 formed in a lower leg portion 12 in which a wheel assembly 13 having a stud 14 is to be inserted. The difference in diameter between the bore 11 into which the stud 14 is to be held is substantially filled by the pin 1 which is first inserted into the bore. The pin is compressed utilizing its external resiliency and the diameter of the pin is reduced upon insertion into the bore, as explained previously. The pin 1 then serves as an axial retention bushing in which the stud 14 of the wheel caster assembly may be inserted. The stud 14 has a circumferential annular groove 10 therein which cooperates with the bump 8 for resiliently, securely holding the wheel assembly in position. The maximum diameter of the stud is smaller than the inserted inner diameter of the spring pin but larger than the inner diameter of the spring pin through the bump 8. The stud may be, for example, cylindrical in shape as disclosed in FIG. 1 or grooved (particularly shown in FIG. 4), the groove mating with the bump 8 in the pin 1.

Accordingly, with the present invention the bump or dent engages the stud so that merely by friction the bolt is retained in the interior of the spiral pin (FIG. 1). In the embodiment of FIG. 4, the bump in the pin snaps into the groove and thereby retains the stud in the proper axial position.

Referring now again to the drawing and more particularly to FIG. 5, another application of the axial retention bushing with external-internal resiliency is illustrated wherein the pin 1 is utilized to hold a plastic knob 15 to a shaft 16. The plastic knob is formed with a bore 17 in which the pin 1 is inserted as previously described. The insertion of the pin contracts the outer diameter of the pin. Thereafter the shaft 16 to which the knob is to be attached is inserted to the interior of the pin 1 utilizing the resiliency of the inner bump 8 for holding the latter therein. Accordingly the sleeve may be releasably secured to the knob.

If a stud to be inserted in a bore is considerably smaller than the bore, a selected pin of the required number of coils can be selected to accommodate the difference in diameter between the bore and the stud to be inserted. Accordingly the pin of the present invention provides a means for connecting, releasably, studs of varying diameter with holes of varying diameter, with the pin acting as an intermediate sleeve being inserted in the bore and being held therein by the external resiliency of the pin.

The internal contact with the stud can be regulated by the number of internal bumps and accordingly the amount of internal frictional contact can be closely regulated as desired by providing any number of bumps as may be necessary. However the frictional contact at the outside of the pin, between the pin and the bore, covers a minimum of approximately 300° of the external surface. Accordingly, this external contact area is substantially fixed. Therefore the variable internal contact area in combination with the fixed external frictional contact area permits the spring to be designed so as to consistently assure removal of the stud releasably without removing the pin, acting as a sleeve or bushing, from its bore. With the pin of the present invention close tolerances are not necessary since as indicated above the stud and the bore to be operatively engaged are not necessary to be formed of close tolerances since a selected pin can accommodate the difference.

The bumps may be formed at various positions on the interior surface and along the length thereof. The pin may also if desired be formed with a head on the end opposite that of the chamfer.

While I have disclosed several embodiments of the present invention, it is to be understood that these embodiments are given by example only and not in a limiting sense.

I claim:

1. A fastening pin, comprising
    a spirally wound sheet material having overlapping ends and forming an integral hollow sleeve,
    the overlapping ends including an inner end and an outer end, said ends extending along the axial length of said pin, said inner end is adapted to engage the outer face of a stud and said outer end is adapted to engage the innerface of a hole in a part, said overlapping ends engaging each other in axial direction, said outer end to constitute an independent external spring, said inner end being formed with at least one radially inwardly directed bump and constituting an independent internal spring member independent from said external spring adapted to engage releasably a stud to be inserted in said sleeve, and said spirally wound sheet material having an inner diametric thickness through said bump smaller than the inner diameter through the rest of said spirally wound sheet material.

2. The fastening pin, as set forth in claim 1, wherein said inner end portion including said edge is spaced from said sheet material wound thereunder along its entire length.

3. The fastening pin, as set forth in claim 1, wherein said at least one bump comprises a single bump located at the center of the length of said pin.

4. A fastening pin assembly for holding a stud member in a bore, comprising a first member including a bore extending from a surface thereof, a stud member having an external diameter smaller than the diameter of said bore, a fastening pin comprising a spirally wound sheet material having an inner end portion on the inner surface thereof forming a hollow sleeve, said inner end portion terminating in an edge extending along the length thereof, said inner end portion including said edge formed with at least one inwardly directed radial bump constituting an internal resilient spring, the spirally wound sheet material having an inner diameter through said bump smaller than the inner diameter through the rest of said spirally wound sheet material, the diameter of said stud member being smaller than the diameter through said rest of said spirally wound sheet material and larger than the inner diameter through said bump, said fastening pin formed with a chamfer at one end and having an external diameter greater than the diameter of said bore, said fastening pin inserted and resiliently secured by its spirally wound sheet material in said bore and being compressed therein in resilient securing spring action, and said stud member inserted in the interior of said spirally wound sheet material releasably secured by said at least one bump.

5. The fastening pin, as set forth in claim 4, wherein said fastening pin has an outer end portion on the outer surface thereof, the end portions of said spirally wound sheet material overlap in spaced relationship from one another in the non-inserted position of said pin in said bore, and said surfaces contiguously abutting each other in the inserted position of said pin in said bore.

6. The fastening pin assembly, as set forth in claim 4, wherein said stud is formed with a circumferential annular groove, said bump extending into said circumferential annular groove in the inserted position of said stud in said pin.

7. The fastening pin assembly, as set forth in claim 4, further comprising a caster wheel member, and said stud constituting a portion of said caster wheel assembly.

8. The fastening pin assembly, as set forth in claim 4, wherein said first member includes a knob.

9. The fastening pin, as set forth in claim 1, wherein said at least one bump forms a small portion of the length of said pin.

10. The fastening pin, as set forth in claim 9, wherein said at least one bump comprises a single bump disposed at the center of the length of said pin.

11. The fastening pin, as set forth in claim 1, wherein said at least one bump extends to the extreme edge of said inner end portion.

* * * * *